United States Patent [19]

Susko

[11] 3,923,390

[45] Dec. 2, 1975

[54] SLIDE PROJECTION APPARATUS
[75] Inventor: James Alan Susko, Findlay, Ohio
[73] Assignee: Cooper Tire & Rubber Company, Findlay, Ohio
[22] Filed: Nov. 19, 1973
[21] Appl. No.: 417,046

[52] U.S. Cl. .................................. 353/95; 353/122
[51] Int. Cl.² .......................................... G03B 1/48
[58] Field of Search ........ 353/30, 122, 120, 95, 107

[56] References Cited
UNITED STATES PATENTS

| | | | |
|---|---|---|---|
| 2,578,420 | 12/1951 | Goodale | 353/122 |
| 2,600,261 | 6/1952 | Pennington | 353/30 |
| 3,344,707 | 10/1967 | Jullien-Davin | 353/107 |

FOREIGN PATENTS OR APPLICATIONS

| | | | |
|---|---|---|---|
| 1,184,719 | 3/1970 | United Kingdom | 353/30 |
| 1,216,912 | 4/1960 | France | 353/111 |

Primary Examiner—Richard E. Aegerter
Assistant Examiner—A. Jason Mirabito
Attorney, Agent, or Firm—Kemon, Palmer & Estabrook

[57] ABSTRACT

An industrial optical slide projector is provided with a slide holder mounted within the projector housing for rotational movement in the plane of the slide. The slide holder also carries a pair of eccentrically mounted cylindrical cams which engage adjacent sides of the slide which is biased into engagement with the cams. Operating means, extending through the walls of the projector housing, permit rotation of the slide holders and rotation of the cams to provide extremely accurate alignment of the slide with respect to the optical axis of the projector.

4 Claims, 4 Drawing Figures

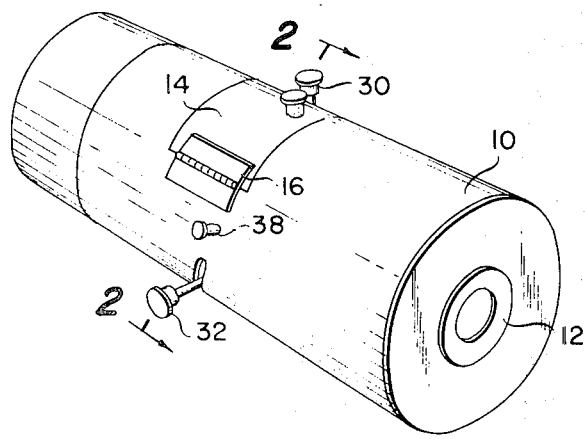
Fig.1
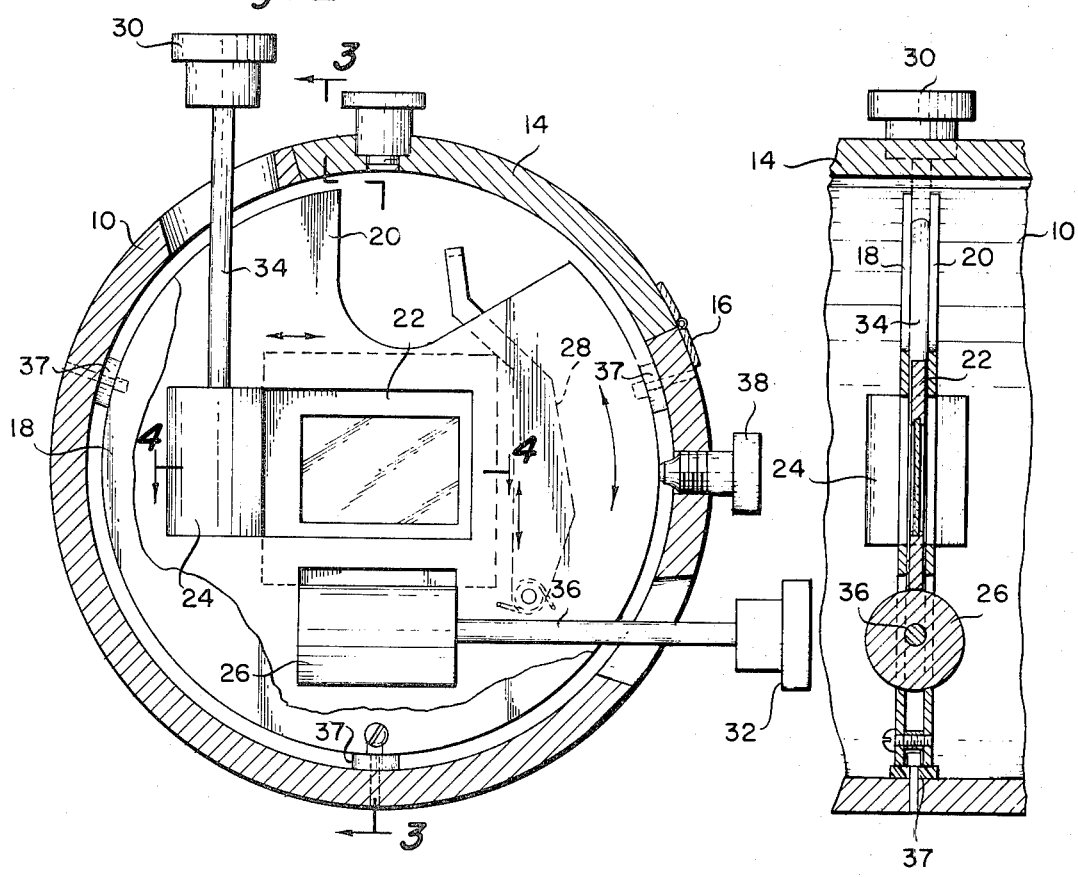
Fig.2
Fig.3
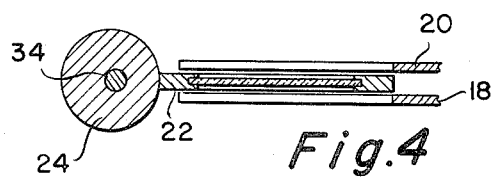
Fig.4

SLIDE PROJECTION APPARATUS

BACKGROUND OF THE INVENTION

The use of optical projection apparatus as an adjunct for various industrial operations is known. The following prior U.S. patents are representative of the apparatus as well as the particular uses to which it has been put:

| | | |
|---|---|---|
| 1,916,567 | 2,906,016 | 3,749,485 |
| 1,953,299 | 2,973,688 | |
| 2,805,471 | 3,551,042 | |

In order to be practical, the projectors for use in industrial areas must differ from conventional home type projectors because they must be designed for continuous industrial operation and in atmospheres which may be contaminated with all kinds of dirt and dust. In addition, there will be applications wherein extremely accurate alignment of the image to be projected with respect to the optical axis of the projector is necessary. For example, in machines for the building of pneumatic tires, the green tire components are first laid up on an elongated rotating cylindrical drum. In order to assist the workmen in correct placement of the various layers of tire building material, the present invention proposes to project optically onto a tire building drum from a single location spaced vertically upwardly from the drum the necessary indicia to insure accurate relative placement of the various tire layers as the construction proceeds. In a system of this type, it is essential that some means be provided within the projector for extremely accurate alignment of the slide bearing the indicia to be projected with respect to the optical axis of the projector. Once the projector has been accurately positioned with respect to the drum, then the slide bearing the indicia to be projected may be changed at will and the new slides may be properly positioned within the projector merely by changing the slide position until the projected image is aligned with respect to a center line which may be scribed onto the surface of the drum.

BRIEF SUMMARY OF THE INVENTION

In general, the present invention provides a slide holder which is rotatable in its own plane around the optical axis of the projector and which also includes a pair of rotatable cams. A biasing means urges the slide into engagement with these two cams which engage adjacent sides of the slide and rotation of the cams provides for extremely accurate alignment of the slide with respect to the optical axis of the system and of the projected image with respect to a particular work area.

BRIEF DESCRIPTION OF THE DRAWINGS

FIG. 1 is a perspective view of the overall projection apparatus of the present invention;

FIG. 2 is a view partially in section on the lines 2—2 of FIG. 1;

FIG. 3 is a section on the lines 3—3 of FIG. 2; and

FIG. 4 is a sectional view on the lines 4—4 of FIG. 2.

DETAILED DESCRIPTION

As shown in FIG. 1, the projection apparatus of the present invention comprises a housing 10 having a projection lens assembly 12 at the front end thereof. Access to the slide holder portion of the apparatus is by way of the door member 14 hingedly connected to the housing 10 as indicated at 16.

Referring now to FIGS. 2, 3, and 4, the slide holder of the present invention comprises a pair of circular plate members 18 and 20 which are parallel and spaced from each other by a distance slightly greater than the thickness of the slide 22 to be projected. The plate members each have a centrally disposed rectangular aperture for the transmission of light from a source (not shown) in the rear of the housing 10. The plates are also apertured to receive a pair of rotatable cams 24 and 26 mounted on axes at right angles to each other so as to engage adjacent sides of a slide inserted into the holders by way of the access door 14. A spring loaded lever 28 is also carried by the slide holder in order to bias the slides into engagement with two cams 24 and 26. The cams are each rotatable by means of knobs 30 and 32 and fixed to the outer ends of shafts 34 and 36 which extend from the cams 24 and 26 respectively through enlarged openings in the side wall of the housing 10.

Bearings 37 are positioned between the slide holder and the inner wall of the housing 10 which permit the entire slide holder assembly limited freedom of rotation in a plane perpendicular to the optical axis of the projector as indicated in FIG. 2. Rotation is effected by means of either of the knobs 30 or 32 since the openings in the wall of the housing 10 for the shafts 34 and 36 are substantially larger in diameter than the shafts themselves. A locking means for the entire assembly is also provided and is a threaded stud having an operating knob 38 shown in FIGS. 1 and 2. The stud merely extends through the wall of the housing 10 and bears against the periphery of slide holder assembly to prevent movement thereof after the adjustments have been completed.

In operation therefore, whenever a slide is to be inserted or changed, the access door 14 is opened permitting access to the slide holder assembly. A slide is then inserted between the plates 18 and 20 and positioned against the two cams 24 and 26 with the spring loaded lever 28 engaging that corner of the slide which is diametrically opposite the sides engaged by the cams. The locking stud 38 is loosened and the entire slide holder assembly is rotated one way or the other to achieve the correct rotational position. The locking mechanism is then reset and the vertical and horizontal positions of the slide are accurately adjusted by rotating the cams 24 and 26.

While a preferred embodiment of the present invention has been herein shown and disclosed, applicant claims the benefit of a full range of equivalents within the scope of the appended claims.

I claim:

1. In a optical slide projection apparatus, a slide holder comprising:

a pair of centrally apertured plates spaced from each other in parallel relation a distance substantially equal to the thickness of a slide to be projected and the area of the apertures corresponding substantially to the area of the slide;

a pair of cams carried by said plates and rotatably mounted on mutually perpendicular axes parallel respectively to adjacent sides of said apertures;

spring biasing means carried by said plates and operative when a slide is positioned in said holder to urge the slide into engagement with said cams; and means extending outwardly of the apparatus permitting selective rotation of said cams to adjust the position of the slide within the holder, said cams contacting elongate portions of adjacent sides of the slide so that rotation of either cam produces straight line rectilinear sliding movement of the slide along the surface of the other cam.

2. Apparatus as defined by claim 1 in which said plates and cam assembly is mounted for rotation about its center in a plane perpendicular to the optical axis of the projector.

3. An optical slide projection apparatus comprising:
an elongated housing having a projection lens assembly at one end thereof;
an access door in the side wall of said housing;
a slide holder assembly mounted within said housing for rotation about the longitudinal axis of said housing; said assembly including a pair of centrally apertured circular plates parallel to each other and spaced apart a distance slightly larger than the thickness of a slide to be projected; a pair of cams rotatably carried by said plates on mutually perpendicular axes adjacent one corner of the aperture in said plates; and means carried by said plates for biasing a slide into engagement with said cams; and means extending through and outwardly of said housing for selective rotation of said cams to adjust the positions of a slide in said holder and to adjust the rotative position of said assembly within said housing said cams contacting elongate portions of adjacent sides of the slide so that rotation of either cam produces straight line rectilinear sliding movement of the slide along the surface of the other cam.

4. Apparatus as defined by claim 3 including means carried by said housing for locking said assembly thereto.

* * * * *